(12) United States Patent
Crawley et al.

(10) Patent No.: US 6,312,831 B1
(45) Date of Patent: Nov. 6, 2001

(54) HIGHLY REFLECTIVE, DURABLE TITANIUM/TIN OXIDE FILMS

(75) Inventors: Richard Lee Crawley, Ann Arbor; Daryl Middleton, Riverview; James Arthur Davis, Dearborn, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/302,885

(22) Filed: Apr. 30, 1999

(51) Int. Cl.$^7$ .......................... B32B 15/04; B32B 18/00; B32B 17/06; G02B 1/02
(52) U.S. Cl. .................... 428/633; 428/334; 428/432; 359/586
(58) Field of Search .................... 428/632, 432, 428/633, 646, 220, 215, 332, 334, 426, 697, 701, 702, 937, 938; 65/60.1, 60.5, 60.51, 60.52; 427/255.1, 255.2, 255.3, 162, 165, 166, 168, 585; 359/586

(56) References Cited

U.S. PATENT DOCUMENTS

| | | | |
|---|---|---|---|
| 2,831,780 | 4/1958 | Deyrup | 117/54 |
| 3,578,920 | * 5/1971 | Okamoto | 179/100.2 C |
| 4,232,062 | 11/1980 | Okino et al. | 427/160 |
| 4,329,379 | 5/1982 | Terneu et al. | 427/166 |
| 4,431,692 | * 2/1984 | Hofmann et al. | 428/35 |
| 4,457,957 | 7/1984 | Novak et al. | 427/226 |
| 4,521,454 | 6/1985 | Kandachi et al. | 427/168 |
| 4,687,687 | 8/1987 | Terneu et al. | 428/34 |
| 5,730,771 | 3/1998 | Terneu et al. | 65/60.5 |
| 5,772,716 | 6/1998 | Krohm et al. | 65/60.2 |

FOREIGN PATENT DOCUMENTS

| | | |
|---|---|---|
| 0901991A2 | 3/1999 | (EP) . |
| 2067540A | 7/1981 | (GB) . |
| 2069475A | 8/1981 | (GB) . |
| 2150044B | 12/1986 | (GB) . |
| 24923 | 2/1980 | (JP) . |
| 3-164431 | * 7/1991 | (JP) . |
| WO 9841480 | 3/1997 | (WO) . |
| WO9710186 | 3/1997 | (WO) . |

* cited by examiner

*Primary Examiner*—Deborah Jones
*Assistant Examiner*—Michael LaVilla
(74) *Attorney, Agent, or Firm*—Steven L. Oberholtzer; Brinks Hofer Gilson & Lione

(57) ABSTRACT

The invention is a substrate having a surface coated with a singular metal oxide film wherein the metal consists essentially of titanium and tin and the film is made from a liquid mixture of a titanate, a tin compound, and an anhydrous organic liquid. The substrate may be glass and the film applied by pyrolytic decomposition of the liquid mixture in air. Preferably, the film has a refractive index of greater than 2.2 and no visible light absorption to give it an optimal neutral appearance.

5 Claims, No Drawings

HIGHLY REFLECTIVE, DURABLE
TITANIUM/TIN OXIDE FILMS

FIELD OF THE INVENTION

This invention is related to a film and a method of placing a $Ti_xSn_yO_z$ film on a substrate, which may be a hot glass substrate. In particular, the metal oxide film is provided from a liquid mixture of heat decomposable materials including a titanate, a tin compound, and an anhydrous organic liquid to provide a film with high reflectivity, neutral color, and excellent chemical and physical durability.

BACKGROUND OF THE INVENTION

Films are often formed on glass to alter some of its physical properties, e.g., radiation reflection. The use of heat-reflecting glass plates as window panes or wall panels in building and vehicles is valuable in avoiding unwanted rise in the interior temperature and reducing the heat load on the interior air conditions. Transparent coatings on glass with high reflectivity and low thermal absorption used in architectural glazing applications allow reasonably high solar performance without the need for heat treatment. The film may also be applied to enhance the color of the glass on which it is applied. From a design perspective, it is important that the film result in a product that is aesthetically pleasing; often a neutral color enhancement and uniform appearance are desired.

One common technique for applying such films to flat glass involves spraying a hot ribbon of glass as it exits the float glass tin bath. A liquid solution of metal compounds which are thermally decomposable by the glass are commonly employed, although powders are often also used. Titanium oxide has long been used as a coating on glass to provide a heat-reflecting glass plate. While titanium oxide exhibits a very reflective appearance, however, it is difficult to produce a highly reflective $TiO_2$ coating with a uniformly neutral color on the glass, and, pure titanium oxide films on glass are susceptible to some physical and chemical durability issues. Other metals have been included with the titanium to alter its properties. For example, tin has been included in titania coatings to improve durability, however, such prior art coatings have reflectivity which is lower than that desired for many architectural glazing applications.

We have now unexpectedly found that by using a titanate, preferably tetrabutyl titanate, as the source of titanium, and a tin compound, preferably dibutyltin-diacetate, in a mixture combined with an anhydrous organic liquid, we can produce an oxide film of titanium and tin which has excellent chemical durability and a unexpected high reflectivity. Use of the titanate allows for incorporation of relatively high amounts of tin oxide in the film while yet providing a highly reflective film. This mixture produces a film exhibiting a very smooth surface, exceptionally neutral appearance and excellent chemical and physical durability. These and other features of the present invention will be discussed in detail below.

SUMMARY OF THE INVENTION

The invention is a substrate carrying a singular film of metal oxide, where the metal consists essentially of titanium and tin. More particularly, the film is made from a liquid mixture of a titanate, a tin compound, and an anhydrous organic liquid. Preferably the titanium compound is an organic titanate like tetrabuty-titanate and the tin compound is dibutyltin diacetate. Preferably the anhydrous organic liquid is kerosene or anhydrous isopropanol. Optimally the film has a refractive index greater than 2.2. Preferably the tin is 10–70 atom percent of the metal in the film, i.e., of the total of tin and titanium. According to another aspect of the invention, it is a method of making the film from the liquid mixture disclosed above. According to one aspect of the invention, the liquid mixture is sprayed by pyrolysis techniques onto a surface of a glass substrate which is at a temperature of at least 1000° F. in the presence of air forming the metal oxide film of titanium and tin.

Advantageously the present invention provides a film with high reflectivity and low absorption in the visible light spectrum. The coating has a surprisingly high refractive index for the amount of tin incorporated. The tin provides excellent chemical and physical durability. Additionally, it is produced by a commercially efficient method since the deposition liquid mixture has been found to be very reactive allowing rapid spraying of the substrate, e.g., glass. The film also has excellent adhesion to the substrate.

DISCLOSURE OF PREFERRED EMBODIMENTS

The substrate is coated with a singular film which is an oxide of substantially titanium and tin. Its composition may be a mixture of titanium oxide and tin oxide or be in the form of tin incorporated in the titanium oxide matrix. Hence the formula $Ti_xSn_yO_z$ is used herein to describe this oxide film along with the phrase titanium/tin oxide. The exact structural determination of the oxide is not necessary for a practice of the invention as will be apparent from a reading of the disclosure herein. The film exhibits, nonetheless, substantial uniformity of the oxide throughout. Preferably, the tin is 10 to 70 atomic percent of the total tin and titanium in the film. That is, the tin atom ratio of 10% means that 10% of the metal in the oxide film is tin, with titanium comprising the remaining 90%. The film was found to retain the essential character of titanium oxide at tin atom ratios of up to 50%. The film has optimal high reflectivity combined with excellent appearance and chemical durability when the tin/metal atom ratio is between 15 and 40%. Most preferred in one embodiment when the film is applied on a glass substrate is a film having a tin atom ratio of about 35%.

Preferably, the titanium/tin oxide film has a refractive index greater than 2.2, preferably being greater than 2.3. Optimally the film has a refractive index for desirable high reflectivity between about 2.32 and 2.6. In this invention, this refractive index is correspondingly linked to a desired high reflectivity and neutral appearance to the film. This index is measured over the 400–700nm wavelength range (i.e. the visible range of the electromagnetic spectrum). The refractive index can be measured by techniques including spectrophotometric ellipsometry, as is well known in the art. In some applications of the present invention, however, where high reflectivity is not as critical as is even more increased durability, an invention film with a refractive index of 2.2 or lower may be useful. Such invention films would thus include higher relative amounts of tin oxide of the ranges disclosed above relative the titanium oxide. The usefulness of this type of invention film would be dictated by the particular film application. $TiO_2$ films made from titanates have a refractive index of 2.4 to 2.6. $SnO_2$ films typically have a refractive index of 1.9. The rutile structure found in the films of this invention suggest that the high refractive index of $TiO_2$ is unexpectedly being retained in the present invention film even for these relatively high concentrations of tin.

By "singular film" as this term is used herein is meant that, in the present invention, the substrate carries a film which is a single layer with no discrete interfaces other than at the surface with the substrate, e.g., the glass. This is in contrast to a film on a substrate which is composed of two or more different compositions, one on top of the other which would have discernible interfaces between the different compositions. Optimally the film of the invention has a thickness of at least 20 nanometers, with 20 to 80 nanometers being more optimal, but most preferably is between about 30 and 60 nm for all substrates. While the films were found to have good optical properties and durability for the range of thickness, e.g., from 20 to 80 nm., the different level of added tin will suggest different optimal thickness to obtain a desired neutral color. For example, to obtain a neutral reflected color when the tin is 35 atom % as in one preferred embodiment, the optimal thickness is between 30 and 60 nm. The film thickness range may be adjusted to desirably produce the most neutral film color while maintaining a highly uniform overall appearance across the entire surface of the substrate. The inclusion of tin with titanium in the oxide has many benefits including better physical and chemical durability and production of a more uniform film appearance by increasing the apparent film thickness.

In order to coat a substrate surface with a film according to the present invention, any of several techniques could be used including such well known techniques as pyrolysis, Chemical Vapor Deposition (CVD), and spin coating. Other useful techniques will be apparent to those skilled in the art in view of the present disclosure, the optimal technique being associated with the particular substrate employed. For example, the substrate may be glass such as automotive or architectural glass, ceramics, metals, or silicon chips, although this is invention is not so limited. In an embodiment of the invention method, the titanate and the tin compound are thermally decomposed and in the presence of air oxidized to their respective metal oxide compounds. The anhydrous organic liquid is vaporized during the method and is not expected to form any part of the film. The titanate, in addition to providing the advantages enumerated above, also is believed to decompose readily at elevated temperatures to eliminate any organic portion of the compound, so that substantially no carbon is included in the resultant metal oxide film. This is believed by the inventors to contribute to the high reflectivity attained by the invention films. Neither the truth nor understanding of this theory is necessary, however, to a practice of the present invention.

In the embodiment where the substrate is glass, pyrolysis techniques are particularly commercially suitable for applying the metal oxide invention film. To apply the film, the mixture of metal oxide precursors (titanate and tin compound) with an anhydrous organic liquid is sprayed onto hot glass, e.g., the hot glass exiting the forming operation such as the tin bath in conventional float glass manufacture or processing. Heat from the glass causes the precursors to decompose and, in the presence of oxygen, they form their oxides. While kerosene may be used, other anhydrous organic liquids, such as, but not limited to, ethyl acetate, isopropanol, and butanol may be used. The anhydrous organic liquid may help keep the titanate from reacting with moisture present in the spray area environment or in storage.

Kerosene is ideal because it is the least expensive and provides for excellent processing. The organic liquid is vaporized during the pyrolysis of the film forming precursors and does not form part of the film. The glass would be at a temperature sufficient to vaporize the organic liquid, decompose the precursors and allow reaction with oxygen present to form the metal oxide film on the glass. The spraying takes place using air to aspirate the spray liquid and additional air to carry it to the glass substrate surface in a uniform fashion. If the solution is sprayed on glass exiting a tin bath during conventional flat glass manufacture, the temperature is expected to be at least about 1100° F., generally about 1125–1130° F. upon exiting the tin bath. The particular temperature is not critical, however, to the practice of this invention as long as the precursors decompose and oxidize to form the metal oxide film on the substrate.

The precursor used in the present invention for the titanium oxide is a titanate, preferably being an organic $C_4$ titanate like tetra-butyl titanate (TBT). This material is a liquid at room temperatures. Other titanates which may be used include, but are not limited to, tetra-isopropyl titanate, octylene-glycol titanate, and tetra-ethyl-titanate. The tetra-butyl titanate is preferred because of its optimal reactivity when sprayed with kerosene which is the optimal anhydrous organic liquid. Titanium containing compounds with the least carbon atoms yield a film with the highest refractive indices and the least absorption. The tin oxide precursor of the film is any tin compound, organic or inorganic, which can suitably decompose to form the metal oxide invention film, and includes compounds such as dibutyl tin diacetate (DBTDA), dibutyltin-difluoride (DBTDF), tin chlorides, and fluorides, organotin chlorides, and tetraalkyl-tin compounds, with DBTDA being preferred. As is discussed herein, the film is substantially tin/titanium oxide. Other materials in small amounts, however, which have no significant impact on the film properties may enter the film as decomposition products from the precursor materials or as contaminants.

When the substrate is glass, the glass coated with the film may be clear glass, it may be colored glass, or may be opaque. For example, it may be for use as external glazings for buildings or automotive use. One example of glass which may be suitably coated with the present invention film is the blue glass disclosed in U.S. Pat. No. 5851940 issued Dec. 12, 1998, which is hereby expressly incorporated by reference for its teachings. Green, bronze, and gray glass appearance is also enhanced by this film. Other glass that would benefit from a reflective, neutral adherent film which is chemically and physically durable can also be so coated.

EXAMPLES 1

In this example a film is made on glass using pyrolysis techniques according to an embodiment of the invention. A liquid mixture consisting of 45% by volume tetra-butyl-titanate(TBT), 45% kerosene, and 10% dibutyltin-diacetate (DBTDA) was sprayed with air onto ¼ inch soda-lime-silica float glass exiting a furnace tin bath at 256 inches per minute. The exit temperature of the furnace was about 1126° F. The liquid mixture flow rate was 8.8 gallons per hour and the spray width was approximately 152 inches. A titanium/tin oxide film was deposited on the glass and had an approximate thickness of 45 nanometers (nm). The refractive index was 2.38@ 590 nm wavelength, with a reflected color of Y=32.0, x=0.291, y=0.300 under light colorant 'C'. This was a surprisingly high value considering there was a relatively high amount of tin in the film, i.e., approximately 35:65 atomic amount tin:titanium, the tin providing increased chemical durability to the film as shown by the tests below.

The physical hardness of the above made film was measured using the standard Taber abrasion method with CS-10F wheels and 500 grams force. Haze values after 1000 cycles were 2.2%, implying excellent scuff resistance. Chemical resistance was measured by 3 methods. 1)

Samples of the coated glass were subjected to HCl vapor for 5 hours and then tested for changes in reflectivity and color. 2) Samples of the coated glass were dipped into a 0.3% solution of HF:HN03 for 5 minutes and then inspected for deterioration. 3) Samples of the coated glass were immersed in a 5% NaOH solution heated to ~170° F. for 1 hour and then inspected for changes in optical properties. The film exhibited no signs of deterioration or change in appearance, suggesting excellent suitability for commercial use.

EXAMPLE 2

For comparative purposes, not according to an embodiment of the present invention, a solution consisting of 50% by volume TBT and 50% kerosene was sprayed under similar conditions to that listed in Example 1 forming a titanium oxide film. This example did not include a tin compound in the film formation. While the reflectivity was higher for a similar neutral reflected color, this titanium oxide film showed some attack when immersed in the HF:$HNO_3$ solution. It also showed some separation from the substrate glass after the 1 hour NaOH immersion. This shows the durability and adhesion advantage of including tin oxide in the film along with the titanium oxide.

EXAMPLE 3

A liquid mixture of 47.5% by volume TBT, 47.5% kerosene, and 5% DBTDA was sprayed under similar conditions to that of Example 1. The film made under these conditions had good reflectivity but was not as uniform in appearance as that of Example 1.

EXAMPLE 4

A liquid mixture of 42.5% by volume TBT, 42.5% kerosene, and 15% DBTDA was sprayed on glass under similar conditions to that of Example 1. This film had significantly lower reflectivity than the film made in Example 1. However, the chemical durability was excellent. Chemical analysis showed that this film had more tin than titanium in it, on a per atom basis.

EXAMPLE 5

A liquid mixture of 50% by volume tetraisopropyl-titanate (TIPT), and 50% kerosene was sprayed on glass under similar conditions to that listed in Example 1. This film had similar performance as that of the comparative film of Example 2. However, it was more difficult to obtain a film with uniform appearance.

EXAMPLE 6

A liquid mixture of 50% by volume TIPT and 50% kerosene was sprayed onto ⅛ inch clear glass exiting a furnace at about 1160° F. This film exhibited similar performance to that of Example 5.

EXAMPLE 7

A liquid mixture of 47.5% by volume TIPT, 47.5% kerosene, and 5% DBTDA was sprayed onto hot glass in a fashion similar to that of Example 6. This film had similar performance to that of Example 3.

EXAMPLE 8

A solution of 45% by volume TIPT, 45% kerosene, and 10% DBTDA was sprayed onto hot glass in a fashion similar to that of Example 6. This film had similar performance to that of the film of Example 1.

EXAMPLE 9

A solution of 40% by volume TIPT, 40% kerosene, and 20% DBTDA was sprayed onto hot glass in a fashion similar to that of Example 6. This film exhibited excellent physical durability but lower reflectivity than that of Examples 1 or 4.

EXAMPLE 10

For comparative purposes, a film was made using titanium acetyl-acetonate instead of a titanate as required in the present invention. A solution of 50% by volume titanium acetyl-acetonate combined with 50% kerosene was sprayed onto hot glass in a fashion similar to that of Example 6. The resulting film had lower reflectivity than the films of Examples 2, 5, and 6 and exhibited surface haze. Moreover, the physical and chemical durability was also significantly poorer for this film than for the other examples having present invention films listed above.

We claim:

1. A substrate coated with a single layer of highly reflective, metal oxide film having a composition consisting essentially of: a titanium oxide and a tin oxide such that the metal oxide film has a refractive index of greater than 2.2 measured at a wavelength in the range of 400–700 nm, the metal oxide film is formed from the thermal decomposition of a liquid mixture comprising: 40–47.5% by volume of an alkyl titanate selected from the group consisting of tetrabutyl titanate, tetra isopropyl titanate, and their mixture, such that the alkyl titanate thermally decomposes to form corresponding titanium oxide, 5–20% by volume of dibutyltin diacetate such that the dibutyltin diacetate thermally decomposes to form corresponding tin oxide, and 40–47.5% by volume of an anhydrous organic liquid, selected from the group consisting of kerosene, isopropyl alcohol and their mixture.

2. The substrate according to claim 1 wherein the metal oxide film is formed by pyrolytic decomposition of the liquid mixture sprayed with air onto a surface of a hot substrate.

3. The substrate according to claim 1 wherein the metal oxide film has a tin metal ion ratio of 20% to 45%.

4. The substrate according to claim 1 wherein the metal oxide film is 20 to 80 nm thick.

5. The substrate according to claim 2 wherein the substrate is automotive or architectural glass.

* * * * *